(12) United States Patent
Hottinen

(10) Patent No.: US 7,684,761 B2
(45) Date of Patent: Mar. 23, 2010

(54) CLOSED-LOOP SIGNALLING METHOD FOR CONTROLLING MULTIPLE TRANSMIT BEAMS AND CORRESPONDINGLY ADAPTED TRANSCEIVER DEVICES

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 1314 days.

(21) Appl. No.: 11/084,086

(22) Filed: Mar. 21, 2005

(65) Prior Publication Data

US 2006/0094373 A1 May 4, 2006

(30) Foreign Application Priority Data

Nov. 4, 2004 (EP) .................... 04026187

(51) Int. Cl.
*H04B 1/00* (2006.01)
(52) U.S. Cl. .................. 455/69; 455/68; 455/67.11; 455/101; 455/132; 375/257; 375/146; 375/267; 375/299; 375/152
(58) Field of Classification Search .................. 455/69, 455/68, 67.11, 101, 132; 375/257, 146, 267, 375/299, 152
See application file for complete search history.

(56) References Cited

U.S. PATENT DOCUMENTS

| | | | |
|---|---|---|---|
| 6,847,805 B2 * | 1/2005 | Liu ............................ 455/69 |
| 6,859,503 B2 * | 2/2005 | Pautler et al. ............... 375/299 |
| 7,050,833 B2 * | 5/2006 | Lobinger et al. .......... 455/562.1 |
| 7,099,678 B2 * | 8/2006 | Vaidyanathan .............. 455/500 |
| 7,139,328 B2 * | 11/2006 | Thomas et al. .............. 375/299 |
| 7,184,773 B2 * | 2/2007 | Nagai et al. .................. 455/450 |
| 7,194,237 B2 * | 3/2007 | Sugar et al. ................... 455/39 |
| 7,200,368 B1 * | 4/2007 | Hottinen et al. ............. 455/101 |

(Continued)

FOREIGN PATENT DOCUMENTS

WO   WO 01/69814 A1   9/2001

(Continued)

OTHER PUBLICATIONS

"*Advanced Closed Loop Tx Diversity Concept*", 3GPP TSG RAN WG 1, TSGR1#14(00)0853, Jul. 2000, pp. 1-12.

(Continued)

*Primary Examiner*—Matthew D Anderson
*Assistant Examiner*—April G Gonzales
(74) *Attorney, Agent, or Firm*—Squire, Sanders & Dempsey L.L.P.

(57) ABSTRACT

A closed-loop signalling method controls multiple transmit beams. The method also includes transmitting a plurality of beams from a first transceiver via a plurality of transmission channels to a second transceiver, evaluating, at the second transceiver, characteristics of the plurality of transmitted beams received at the second transceiver. The method also includes deriving, at the second transceiver, beamforming information for being fed back from the second transceiver to the first transceiver based on the evaluated characteristics. The beamforming information is usable for controlling, at the first transceiver, the transmitting of the plurality of beams. The method also includes selecting, at the second transceiver, at least one set of beamforming information for being fed back from the second transceiver via a feedback path to the first transceiver. The method also includes calculating, at the first transceiver, additional beamforming information which was not contained in the feedback path, based on the beamforming information being fed back.

4 Claims, 5 Drawing Sheets closed-loop diversity in downlink

U.S. PATENT DOCUMENTS

| | | | | |
|---|---|---|---|---|
| 7,239,659 | B2* | 7/2007 | Thomas et al. | 375/141 |
| 7,330,701 | B2* | 2/2008 | Mukkavilli et al. | 455/69 |
| 7,333,560 | B2* | 2/2008 | Jalali et al. | 375/296 |
| 7,336,727 | B2* | 2/2008 | Mukkavilli et al. | 375/299 |
| 2003/0185309 | A1* | 10/2003 | Pautler et al. | 375/257 |

FOREIGN PATENT DOCUMENTS

| | | | |
|---|---|---|---|
| WO | WO 02/41524 | A1 | 5/2002 |
| WO | WO 03/023995 | A1 | 3/2003 |
| WO | WO 03/069800 | A1 | 8/2003 |

OTHER PUBLICATIONS

"Recommended Simulation Parameters For Tx Diversity Simulations", #GPP TSG RAN WG1, TSGR#14(00)0867, Jul. 2000, pp. 1-5.

Utschick, Wolfgang et al., "*Efficient Tracking And Feedback Of DL-Eigenbeams In WCDMA*", pp. 1-7.

Brunner, Christopher et al., "*Exploiting the Short-Term and Long-Term Channel Properties in Space and Time: Eigenbeamforming Concepts for the BS in WCDMA*", vol. 12, No. 5, Sep. 5, 2001, XP001107619, pp. 365-378.

Hottinen, Ari et al., "*Transmit Diversity Using Filtered Feedback Weights in the FDD/WCDMA System*", XP-001023307, Feb. 15, 2000, pp. 15-21.

"Improved MIMO Feedback and Per-Stream ABL for OFDMA/OFDM Systems," IEEE 802.16 Broadband Wireless Access Working Group, Aug. 17, 2004.

"A Framework for Adaptive Matrix Modulation for HSDPA MIMO Channels," Ari Hottinen, Apr. 24, 2003.

"Channel Feedback Quantization Methods for MISO and MIMO Systems," June Chul Roh and Bhaskar D. Rao, 2004 IEEE.

\* cited by examiner

CLOSED-LOOP SIGNALLING METHOD FOR CONTROLLING MULTIPLE TRANSMIT BEAMS AND CORRESPONDINGLY ADAPTED TRANSCEIVER DEVICES

FIELD OF THE INVENTION

The present invention relates to a closed-loop signalling method for controlling multiple transmit beams and correspondingly adapted transceiver devices.

BACKGROUND OF THE INVENTION

MIMO (multiple input multiple output) transmission/reception concepts or diversity is used in communication systems such as wireless communication systems in order to enhance communication quality by transmitting information to be transmitted via various (e.g. space and/or time varying) channels. Common to both concepts, MIMO and diversity, is that multiple parallel beams are needed. The expression "beam" as used herein means a spatial transmission channel.

For the sake of keeping the explanations simple, the following description focuses on diversity, while the given explanations are equally applicable to MIMO concepts.

Diversity arrangements can be categorized as open-loop diversity and closed-loop diversity concepts. Also hybrids are possible, which combine both open-loop and closed-loop approaches.

Closed-loop diversity concepts apply channel state information at the transmitter. In systems with channel reciprocity (e.g. Time Divisional Duplex, i.e. TDD) this is inherently available. The invention is thus applicable also in such systems. However, in conventional FDD systems (Frequency Divisional Duplex) channel reciprocity does not hold, and a feedback channel conveying channel-related information from the receiver to the transmitter is needed to thereby perform a feedback control of the diversity transmission.

The closed-loop techniques adopted in 3GPP (3rd Generation Partnership Project) typically attempt to approximate beamforming with perfect or average (spatial) channel state information in the transmitter. Then, one obtains array gains as the signal transmitted by the different antenna elements (forming an array) can be combined coherently. Naturally, conveying the channel state information, or some function of channel state information (such as beam coefficients that maximize Signal-Interference-Noise-Ratio SINR for the given channel, supportable signalling formats, or the like) with sufficient reliability and transmission rate can require a (feedback) signalling channel of relative high capacity from the user equipment (UE) to the network and/or to the base station(s).

Note that the user equipment UE according to 3GPP and/or UMTS (Universal Mobile Telecommunication Standard) corresponds to a mobile station according to GSM (Global Standard of Mobile Communication). The present invention as described herein below is, however, not limited to be applied to a specific communication standard. References to UMTS 3GPP standard currently being developed serve as a mere example only and are not limiting the scope of the invention. The invention is related to any transmitting unit and any receiving unit. While the text below considers mostly downlink direction, it is evident that the roles of UE and network, i.e. Node_B or base station BS, may be exchanged here, i.e. the method of invention is equally applicable in uplink direction, or in any peer-to-peer link. Any transceiver device as described herein comprises a transmitter and a receiver. In a Node_B, the receiver receives feedback signals transmitted from the transmitter of a user equipment UE; and in a user equipment, the receiver receives downlink transmission signals transmitted from a transmitter of a Node_B.

FIG. 1 shows in rough outline the feedback control arrangement for closed-loop diversity concepts. A communication network NW 1 (e.g. UMTS or GSM or any other network) is represented by one of a plurality of Node_B's 2 (UMTS) (corresponding to a base station BS in GSM). The Node_B 2 is provided with an array of M antennas or antenna elements Ant1, . . . , Antm, . . . AntM from which a corresponding plurality of M beams beam_1, . . . , beam_m, . . . , beam_M emerges in direction to the user equipment UE 3. Each individual beam m (typically, 1<=m<=M) in downlink direction travels and/or propagates via a transmission channel 5 that can be represented by its channel transfer function hm. The array of antennas thus leads to an (M-dimensional) matrix of channel transfer functions H=[h1, . . . , hm, . . . , hM] representing the transmission channel between the Node_B 2 as a first transceiver and the intended receiver as a second transceiver, which may have one or more than one antenna elements. In particular, in MIMO channels the receiver 3 typically has more than one receiving antenna. For the purpose of the present invention, with regard to a downlink arrangement, a Node_B 2 and/or base station represents a first transceiver, while a user equipment UE 3 and/or mobile station represents a second transceiver. Notwithstanding this, as mentioned above, in case of an uplink arrangement, a Node_B 2 and/or base station represents a second transceiver, while a user equipment UE 3 and/or mobile station represents a first transceiver. However, the invention is not restricted to this but can be applied for any similar multi-antenna transmitter-receiver concept, either in downlink or in uplink direction.

Upon receiving a plurality of at least two beams from the first transceiver via the plurality of transmission channels at the second transceiver, the second transceiver performs well known processing techniques to e.g. obtain the channel transfer functions (estimates), and derives control information for being fed back from said second transceiver UE 3 to said first transceiver Node_B 2 in order to accomplish a feedback control. Note that the channel transfer function estimates may, for example, be obtained using Viterbi detection and/or processing of pilot signals containing known training sequences, using joint data detection, channel decoding, and channel estimation methods, or by any other suitable known method. For example, the channel estimates may be estimated based on CPICH measurements (CPICH=Common Pilot Channel).

Also, since a second transceiver, mostly for practical purposes, has a limited diversity capability as compared to the first transceiver (e.g. due to a limited space for plural antenna elements and due to cost reasons involved in designing the UE's/MS's representing in the chosen downlink example the second transceiver) the feedback path 4 carries beamforming information (control signals) related to Nbeam beams and the formation of Nbeam beams using a linear combination of M antenna elements and/or channels or beams. Based on the feedback beamforming information, an improvement of the performance of a subsequent transmission from the first transceiver to the second transceiver can be accomplished. Typically, the number of Nbeam satisfies the criterion of 1<=Nbeam<=M.

W. Utschnik et al presented in the Proc. 4th European Personal Mobile Communications Conference, Vienna, Austria, February 2000, a contribution entitled "Efficient tracking and feedback of DL-Eigenbeams in WCDMA" by means of which a distributed implementation of the eigenspace/-beam tracking at the user equipment and the base station, respectively, was proposed with a corresponding feedback signalling. The adopted feedback signalling is fixed.

In the 3GPP TSG RAN WG 1 Meeting #14, 4-7th July 200, Oulu, Finland, Siemens submitted a proposal for an "Advanced closed loop Tx diversity concept (eigenbeamformer)" for discussion. The feedback signalling used in the thus proposed arrangement is still considerable.

WO-A1-03/023995 also conceived by the present inventor and assigned to the present applicant discloses a closed-loop signalling method for controlling multiple transmit beams, which adopts a method that is improved in terms of its feedback signalling, thereby minimising an overhead due to feedback signalling. A fixed feedback capacity is sharedly used for transmitting beamforming information of Nbeam beams, with the partitioning of the feedback capacity depending on the dominance/importance of the respective information.

However, those previously proposed concepts are based on an assumption that the first transceiver uses the feedback control information as such. Furthermore, the second transceiver operates as a stand-alone entity when deriving feedback information.

Therefore, concepts described above are likely to be affected by errors which may occur or be introduced in the feedback control information during transmission, thus degrading the performance of the diversity or MIMO transmission. Also, the feedback transmission path still consumes a considerable amount of transmission resources/capacity.

SUMMARY OF THE INVENTION

Therefore, it is an object of the present invention to provide a closed-loop signalling method for controlling multiple transmit beams which is free from the above drawbacks. Also, it is an object of the present invention to provide correspondingly adapted transceivers.

According to the present invention, this object is for example achieved by a closed-loop signalling method for controlling multiple transmit beams, said method comprising the steps of:
  transmitting a plurality of beams from a first transceiver via a plurality of transmission channels to a second transceiver,
  evaluating, at the second transceiver, characteristics of the plurality of beams received at the second transceiver,
  deriving, at the second transceiver, beamforming information to be fed back from the second transceiver to the first transceiver based on the characteristics, wherein the beamforming information is usable for controlling, at the first transceiver, the transmitting of the plurality of beams,
  selecting, at the second transceiver, at least one set of beamforming information to be fed back from the second transceiver via a feedback path to the first transceiver, and
  calculating, at the first transceiver, additional beamforming information which was not contained in the feedback path, based on the at least one set of beamforming information being fed back.

According to favourable refinements of the method
  the selecting comprises selecting said at least one set of beamforming information based on at least one performance criterion of the transmitting;
  the selecting comprises selecting said at least one set of beamforming information based on a transmitting method applied at the first transceiver;
  the at least one performance criterion comprises at least one of a receiving power, a bit error rate, and an interference ratio of the plurality of beams received at the second transceiver;
  the transmitting method is defined by at least one of a modulation principle applied at the first transceiver, an interference feature configured for MIMO channels, and a coding principle applied at the first transceiver;
  the evaluating comprises estimating a channel matrix of channel impulse responses of the plurality of transmission channels and calculating a correlation matrix based on the channel matrix of the channel impulse responses of the plurality of transmission channels;
  the deriving of beamforming information comprises processing the correlation matrix using a function which maximizes a performance criterion of the plurality of beams;
  the function comprises an Eigenvalue decomposition (EVD), a Discrete Fourier Transformation (DFT) or a Fast Fourier Transformation (FFT);
  the performance criterion comprises a receiving power, a bit error rate, or an interference ratio of transmitted signals received at the second transceiver;
  the step of selecting, at the second transceiver, further comprises a step of projecting the beamforming information to nullspace, and feeding back the beamforming information and nullspace projection information to the first transceiver;
  the step of calculating, at the first transceiver, further comprises a step of projecting the nullspace projection information to a beamspace projection, and controlling, at the first transceiver, the transmitting of the plurality of beams based on the beamforming information and the beamspace projection;
  the step of selecting, at the second transceiver, further comprises feeding back the beamforming information to the first transceiver;
  the step of calculating, at the first transceiver, further comprises, a step of projecting the beamforming information to a nullspace projection, a step of projecting the nullspace projection to a beamspace projection, and controlling, at the first transceiver, the transmitting of the plurality of beams based on the beamforming information and the beamspace projection;
  the step of selecting comprises selecting a maximum of a processing result;
  the step of selecting comprises selecting a minimum of a processing result.

Furthermore, according to the present invention, the above object is achieved by a transceiver configured to control multiple transmit beams, the transceiver comprising:
  a transmitter configured to transmit a plurality of beams via a plurality of transmission channels to another transceiver,
  a receiver configured to receive beamforming information fed back from the second transceiver, and
  a calculator configured to calculate, based on the beamforming information being fed back, additional beamforming information which was not contained in a feedback path.

According to favourable refinements of the transceiver
  the calculator further comprises, a projector configured to project a received nullspace projection back to a beamspace projection, and a controller, to control transmitting of the plurality of beams based on the beamforming information and the beamspace projection;

the calculator further comprises, a projector configured to project said beamforming information to a nullspace projection and to project the nullspace projection to a beamspace projection, and a controller configured to control transmitting of the plurality of beams based on the beamforming information and the beamspace projection.

Furthermore, according to the present invention, the above object is achieved by a transceiver, comprising:

a receiver configured to receive a plurality of beams from another transceiver via a plurality of transmission channels, an evaluator configured to evaluate characteristics of the plurality of beams received, a derivator configured to derive beamforming information for being fed back from the transceiver to the another transceiver based on the characteristics, wherein the beamforming information is usable for controlling a transmitter at the another transceiver, and a selector configured to select at least one set of the beamforming information for being fed back via a feedback path to the another transceiver.

According to favourable refinements of the transceiver the selector is operated based on at least one performance criterion of the plurality of beams;

the selector is operated based on a transmitting method applied at the another transceiver;

the performance criterion comprises at least one of a receiving power, a bit error rate, and an interference ratio of the plurality of beams received at the transceiver;

the transmitting method is defined by at least one of a modulation principle applied at the another transceiver, an interference feature configured for MIMO channels, and a coding principle applied at the another transceiver;

the evaluator comprises an estimator configured to estimate a channel matrix of channel impulse responses of the plurality of transmission channels, and a calculator configured to calculate a correlation matrix based on the channel matrix of the channel impulse responses of the plurality of transmission channels;

the derivator comprises a processor configured to process the correlation matrix using a function which maximizes a performance criterion of the plurality of beams;

the processor is configured to perform an Eigenvalue decomposition (EVD), a Discrete Fourier Transformation (DFT) or a Fast Fourier Transformation (FFT);

the performance criterion comprises a receiving power, a bit error rate, or an interference ratio of transmitted signals received at the transceiver;

the selector further comprises a projector configured to project the beamforming information to a nullspace projection, and a transmitter configured to feed back the beamforming information and the nullspace projection to the another transceiver;

the selector further comprises a transmitter configured to feed back the beamforming information to the another transceiver;

the selector is configured to select a maximum of a processing result;

the selector is configured to select a minimum of a processing result.

Furthermore, according to the present invention, the above object is achieved by a system for controlling multiple transmit beams, the system comprising:

transmitting means for transmitting a plurality of beams from a first transceiver via a plurality of transmission channels to a second transceiver;

evaluating means for evaluating, at the second transceiver, characteristics of the plurality of beams received at the second transceiver;

deriving means for deriving at the second transceiver, beamforming information to be fed back from the second transceiver to the first transceiver based on the characteristics, wherein the beamforming information is usable for controlling, at the first transceiver, the transmitting of the plurality of beams;

selecting means for selecting, at the second transceiver, at least one set of beamforming information to be fed back from the second transceiver via a feedback path to the first transceiver;

calculating means for calculating, at the first transceiver, additional beamforming information which was not contained in the feedback path based on the at least one set of beamforming information.

Thus, by virtue of the present invention being implemented, the following advantages are achieved, the advantages being exemplary examples which may be individually achieved with at least one embodiment of the invention, while the embodiment concerned does not need to show all mentioned advantages.

The invention makes the feedback signalling more robust to errors, and improves the performance. Also, it proposes a simple signal processing means to improve the calculation of downlink beams using feedback information.

Still further, advantages of the proposed concept include that it holds on 3GPP MIMO beamforming concept as a special case (namely when two transmit antennas are used). In this case the concept can be applied so that only one eigenvector is signaled to the BS, and the second eigenvector is determined implicitly up to the complex factor. The complex phasing coefficient may be determined to mitigate peak-to-average power of the transmitter, or via closed-loop feedback, etc.

As derivable form the above, in contrast to the prior art where it is assumed that the first transceiver (Node_B) does not take into account the processing applied in the second transceiver (UE) for deriving the feedback information, according to some embodiments of the present invention, indeed, such assumptions and/or knowledge of a processing applied at the respective other transceiver, are used both in deriving or using the feedback information at UE and/or at Node B.

In addition, with the same feedback channel capacity as the prior art arrangements use, the present invention is able to construct more effective transmit beams and improve performance.

The method of invention applies in all cases where orthogonal or unitary matrices are signalled to the transmitter for modifying or constructing beamforming coefficients.

According to a particular embodiment of the invention, the algorithm uses the fact that eigenvectors are orthogonal, or the fact that two transmit beams cannot be (near) identical (for example, multi-stream MIMO transmission fails if the beams are identical. And the beams may be almost identical if there are feedback errors.) If the dominant beams are represented with greater accuracy, the other beams may be represented with fewer bits. This, since the first beam (etc.) also contain information (subspace structure) pertaining to all other beams e.g. due to orthogonality or unitarity constraint. The resolution of the other beams may be enhanced if the orthogonality constraint is put to use.

The constraint posed by the subspace structure also allows to provide feedback in a lower dimensional space (as if the transmitter had fewer antenna elements for each of the less dominant beams). Stated in other words, with reference to a matrix representation of feedback information, some (conventionally present) information is not present, thus "removed" or "suppressed" according to embodiments of the present invention. When only a few bits are used to represent (the coordinates of) less dominant beams, they are in general not orthogonal to other beams. When this happens, the algorithm then naturally orthogonalizes them, and simultaneously changes (typically reduces, but may also be configured to increase) the relative transmit power of the less-dominant beams (power allocation can be also used to achieve this effect). The orthogonalization procedure may prioritize the dominant or most reliable beams, keeping them intact, while modifying the other beams with subspace information.

In closed-loop transmit diversity (TX diversity): The required number of feedback bits for short term feedback can be reduced as a diversity beam is on the average less powerful than the dominant beam (it can be agreed e.g. that the dedicated diversity beam is transmitted with smaller power and/or with fewer short-term feedback bits).

In closed-loop MIMO: the required number of feedback bits for short term feedback can be reduced as a beam carrying the additional symbols of a given multi-antenna modulator (for MIMO rate increase) is on the average less powerful than the dominant beam (it can be agreed e.g. that the additional beams are transmitted with lower data or symbol rate).

According to practical research work of the inventor, MIMO simulations were carried out, where two instantaneous beams are fed back to a Node_B and/or Base Transceiver Station BTS, and two parallel 16QAM (quadrature amplitude modulation) streams are transmitted using TxD-MIMO (TSTTD) (iid Rayleigh channel). The columns of the TSTTD modulator are transmitted over two beams, controlled by feedback information. A dominant beam uses 8 PSK quantization (Phase Shift Keying) for each weighting coefficient, and the second beam 4 PSK quantization per coordinate of a respective weighting vector. The projection-based method and a direct method (where the step of modifying by projecting is not present) are simulated. It is seen in FIG. 5 that the proposed method gives about 0.7 dB gain over the state-of-the art method according to PCT/EP01/10229. Here, the transmitter has 4 Tx antennas and the receiver 2 Rx antennas, feedback delay is 9 slots, and altogether 15 bits are used to represent the two beams (for comparison, current TXAA Mode 2 (only 2 tx antennas) uses 12 bits, and Mode 1 uses 4 bits.) In this example, the feedback information is not modified in the second transceiver, but only in the first transceiver, before transmission from the first transceiver to the second transceiver. Hence, the method is applied here to improve performance, and not for reducing feedback signaling capacity.

Thus, the present invention relates to a method to feed back information (signalled from UE to BS) usable for beamforming at the BS. The method, according to a particular embodiment, uses the orthogonality and/or relative dominance of at least two beams, to create a set of transmit beams, so that subspace structure is maintained (better) at the transmitter. This allows to further reduce the number of feedback bits for less dominant beams, since all previously signalled beams also constrain the subsequent beams. The present invention works particularly well when combined with the teaching of PCT/EP01/10229.

Thus, the invention uses feedback information (provided e.g. by UE to BS) and its structural (subspace) properties, to improve closed-loop transmit-diversity and/or closed-loop MIMO transmission.

BRIEF DESCRIPTION OF THE DRAWINGS

The present invention will be more readily understood when read in conjunction with the accompanying drawings, in which.

DETAILED DESCRIPTION OF THE EMBODIMENTS

The present invention will subsequently be described in detail with reference to the drawings.

It is to be noted that the present invention may advantageously be applied to the feedback structure shown in FIG. 1 and already described in detail herein above, so that a repeated description thereof is considered to be dispensable.

It is further to be noted that a beam means a spatial transmission channel. Each antenna or antenna element may emit one beam, while it is also possible that depending on the antenna characteristic (e.g. directivity pattern) one antenna and/or antenna element may emit plural beams. For simplicity, however, the subsequent description will assume that one beam per antenna element is being emitted.

Firstly, the present invention will subsequently be described in connection with a basic embodiment. The basic embodiment represents a generalized, high level description of the invention. Following the description of the basic embodiment, more specific embodiments of the invention will be described, with this description including details on a mathematical descriptive approach for the embodiments of the present invention. Subsequently, modifications to the basic and/or specific embodiments will be described in outline.

Basic Embodiment

Figure 1:
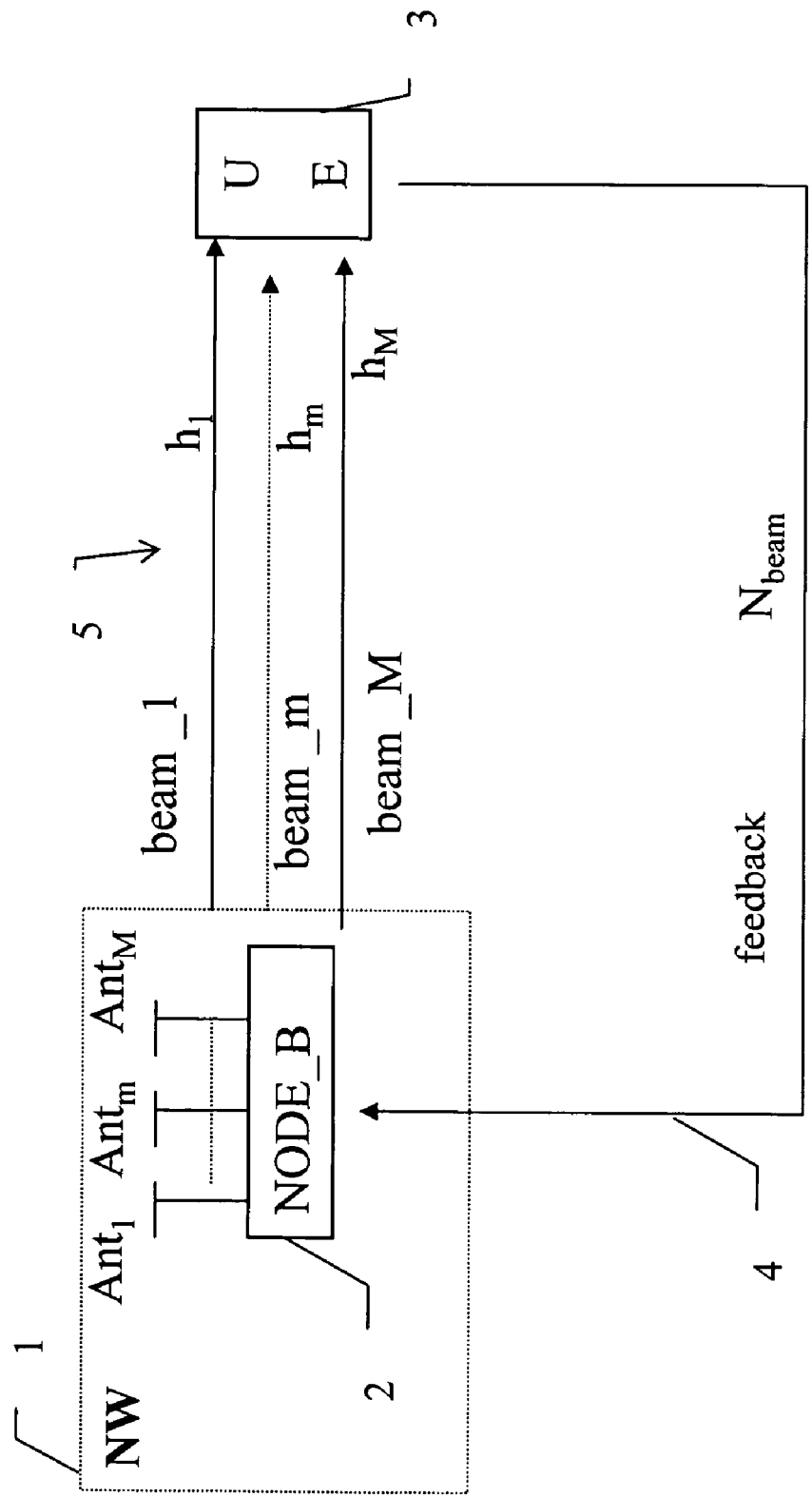
FIG. 1 shows a general closed-loop diversity arrangement, to which the present invention may advantageously be applied.
Figure 2:
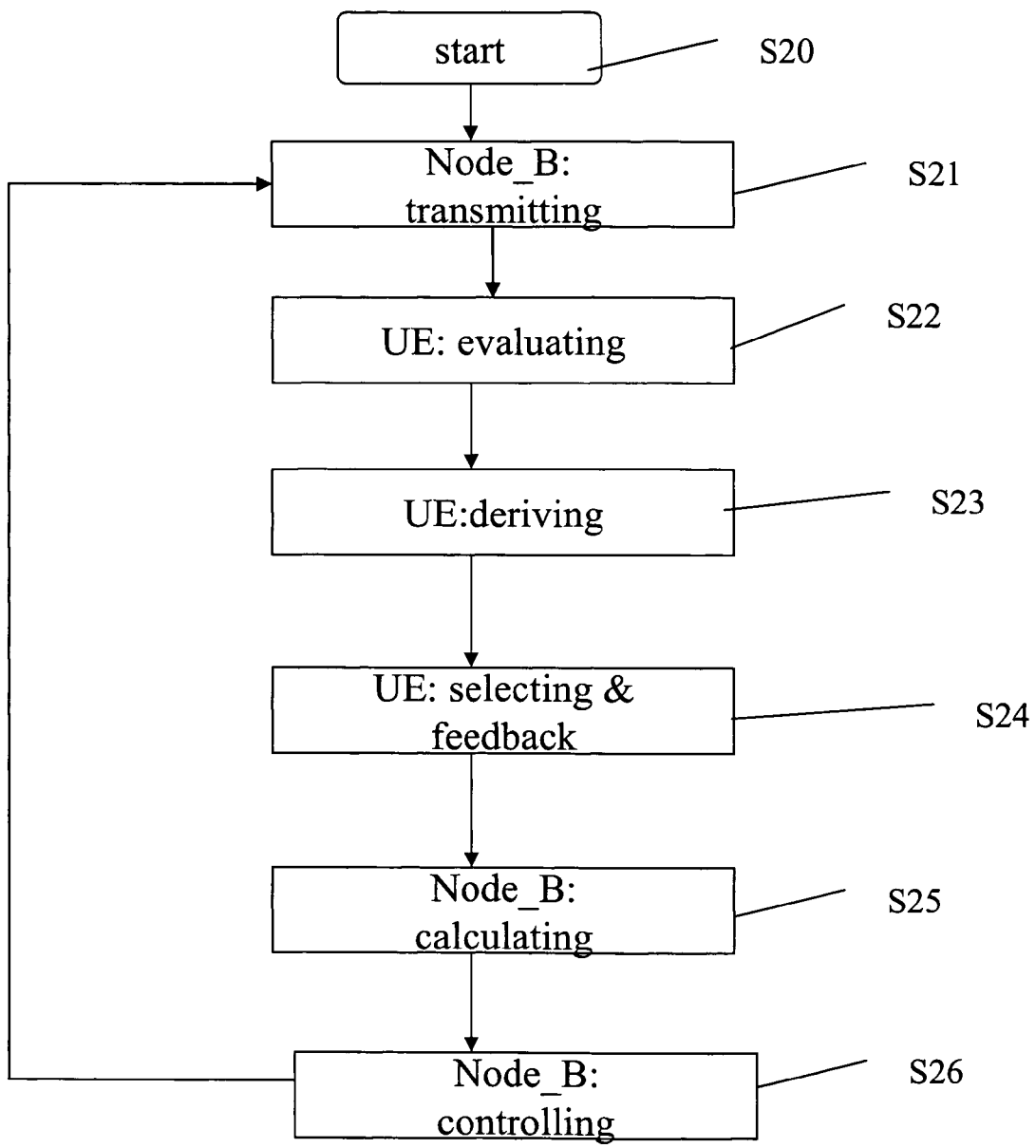
FIG. 2 shows a basic flowchart of the closed-loop signalling method for controlling multiple transmit beams.

The basic embodiment is shown as a flowchart in FIG. 2. The procedure starts in step S20. Then, at step S21, at the Node_B as a first transceiver, the method involves transmitting a plurality M of at least two beams beam_1, . . . , beam_m, . . . , beam_M from the first transceiver, i.e. Node_B, via a plurality of transmission channels to a second transceiver UE. (The reference signs not denoting a step numbering refer to the arrangement shown in FIG. 1.) Then, in step S22, the method involves at the second transceiver, evaluating characteristics of the plurality of transmitted beams received at the second transceiver UE, followed in step S23 by deriving beamforming information for being fed back from the second transceiver UE to the first transceiver Node_B based on the evaluated characteristics. The beamforming information is usable for controlling, at the first transceiver, the transmitting of the plurality of beams. Thereafter, at step S24 there occurs a selecting of at least one set of beamforming information for being fed back from the second transceiver UE via a feedback path to the first transceiver Node_B. After this, at the first transceiver UE, there is a calculating in step S25, based on the selected beamforming information being fed back, of additional beamforming information which was not contained in the feedback path.

Stated in other words, certain beamforming information are obtained by calculation but at the first transceiver Node_B, based on exploiting certain properties such as a subspace constraint and/or orthogonality of the derived beamforming information at the second transceiver UE. The applied calculation is different from a decoding or decompressing as it actually "generates" beamforming information not transmitted over the feedback path.

Beamforming information being fed back as well as the calculated beamforming information are then used in step S26 at the first transceiver to control the transmitting and thus to accomplish feedback control, i.e. closed-loop signalling for controlling multiple transmit beams.

It is to be noted that the selecting can be based on at least one performance criterion of the transmitting. This means that for example the performance criterion for selecting is a receiving power, a bit error rate, and/or an interference ratio of the transmitted signals received at the second transceiver. The above mentioned performance criteria are indicated as mere examples only and not intended as limiting the present invention in this regard to those criteria. Rather, any other suitable performance criterion for transmitted signals upon reception may be applicable.

Additionally or alternatively, the selecting can be based on a transmitting method applied at the first transceiver. If so, for example, the transmitting method is defined by a modulation principle applied at the first transceiver, an interference feature configured for MIMO channels (in case of MIMO transmission), and/or a coding principle applied at the first transceiver. The above mentioned items are given as mere examples only and not intended as limiting the present invention in this regard to those criteria.

Furthermore, the step of evaluating, S22, comprises estimating a channel matrix of the channel impulse responses of the plurality of channels and calculating a correlation matrix based on the channel matrix of the channel impulse responses of the plurality of channels.

Stated in other words, with regard to a functionality implemented at the second transceiver UE, once the user equipment UE has received the plurality of M beams (transmitted in S21 in FIG. 2) from the Node_B as the first transceiver device, the following functions are performed regarding the evaluation (step S22):

Channel estimates $h_m$ ($1<=m<=M$) of each m-th antenna/antenna element will be calculated e.g. based on CPICH measurements. This will lead to a channel matrix H of channel impulse responses $h_m$ of the plurality of M channels. (Each channel impulse response $h_m$ has L components, as defined below.)

Then, the user equipment UE calculates a correlation matrix R using the channel estimates from each antenna with integration over P channel estimates (e.g. over one (P=1) or multiple (P>1) slots/frames)(short-term or long-term corre-lation matrix is obtainable by proper selection of the value of P):

$$R = 1/P \Sigma H_P^H H_P$$

$$H_P = [h_1^P \ldots h_M^P] \in C^{L \times M} \quad (1)$$

Note that h denotes an individual channel transfer function estimate, and the lower index denotes the antenna element $1<=m<=M$, the upper index denotes the channel estimate $1<=i<=P$, C denotes the set of complex values in a space of M×L (M being the number of antenna elements and L the number of delayed multipath components or temporal length of the impulse response). H denotes the channel matrix formed of M channel estimates (capital M denotes the total number of antenna units/elements i.e. the total number of channels to be estimated regardless of what the respective radiation patterns are). Further $H^H$ denotes the transposed and conjugate complex matrix of channel matrix H. The correlation matrix is (basically) formed by multiplying H with its transposed and conjugate complex matrix $H^H$.

Based on the above result of evaluating, the method according to the present invention involves a step S23 of deriving of beamforming information, which comprises processing the correlation matrix using a function which maximizes a performance criterion of the received plurality of beams. Such function can be an Eigenvalue decomposition EVD, a Discrete Fourier Transformation DFT or a Fast Fourier Transformation FFT, or the like. The above mentioned functions are given as mere examples only and not intended as limiting the present invention in this regard to those functions. By applying such functions, a performance criterion such as a receiving power, a bit error rate, or an interference ratio of transmitted signals received at the second transceiver can be maximized.

Subsequently, the case of applying an Eigenvalue Decompostion EVD for maximizing a receiving power will be considered as an example.

This means, using the aggregate correlation matrix of formula (1) above, the user equipment UE calculates eigenvectors/values $w_i$ (i=1, . . . , Nbeam) for the Nbeam largest eigenvalues.

The eigenvectors corresponding to the largest Eigenvalues thus represent the most dominant beams. Eigenvectors define the best linear combination (H*W) of channel H, so that if these beams were used (for transmission), the received signal power would be maximized. At this point, the UE receives beams from which measurements are being made, and the eigenvectors W are not used yet. (This is not to be mixed up to mean the strongest beams from where e.g. CPICH is received from).

Note that Nbeam is the number of beams for which information is conveyed from the user equipment UE via the feedback path to the Node_B, for which $1<=Nbeam<=M$ holds. Nbeam, just like the beams itself, can be determined in a number of ways. It may depend on the (number of) eigenvalues of the channel correlation matrix, the eigenvalues of the averaged correlation matrix (averaged over fading states, (sub) carrier frequencies, etc.), on the used transmission methods (i.e. the modulation coding used to distribute symbols over beams), target signal to noise ratio, etc.

The beamforming vector (matrix) W has thus Nbeam vectorized components and can be written as $$W = [w_1, \ldots, w_i, \ldots, w_{Nbeam}] \quad (2)$$

In general, each component Nbeam in turn bears information pertaining to all M antenna elements based on the channel estimates $h_m$ ($1<=m<=M$).

Hence, equation (2) can be rewritten as an M×Nbeam dimensional matrix of $$W = \begin{matrix} w_{11}, & \cdots & w_{m1}, & \cdots & w_{Nbeam1} \\ w_{12}, & \cdots & w_{m2}, & \cdots & w_{Nbeam2} \\ \cdots & & \cdots & & \cdots \\ w_{1M} & \cdots & w_{mM}, & \cdots & w_{Nbeam\_M} \end{matrix}$$

The thus derived beamforming information is subjected to a selecting processing. This selecting processing involves a selecting of at least one set of beamforming information for being fed back from the second transceiver via a feedback path to the first transceiver, and possibly, dependent on the specific embodiment concerned and as described herein below, involves some processing of the selected beamforming information, prior to being fed back from the second transceiver UE via the feedback path to the first transceiver Node_B. Note that each column of the above indicated matrix W, i.e. w1, ... wNbeam as a respective Eigenvector, can be regarded as a set of beamforming information that may be selected.

At the Node_B, the received beamforming information are subjected to an appropriate receiving processing, which may depend from the specific embodiment concerned and as described herein below, and then used for controlling a subsequent transmitting from the Node_B to the UE, thereby "closing the feedback loop".

Hereinbefore, the present invention has mainly been described with reference to the method concerned. Nevertheless, it is to be understood that correspondingly adapted devices are also concerned by the present invention. In particular, a respective device is equipped with means and/or functionalities configured to carry out the processing as described already or subsequently described with reference to the method.

Figure 3:
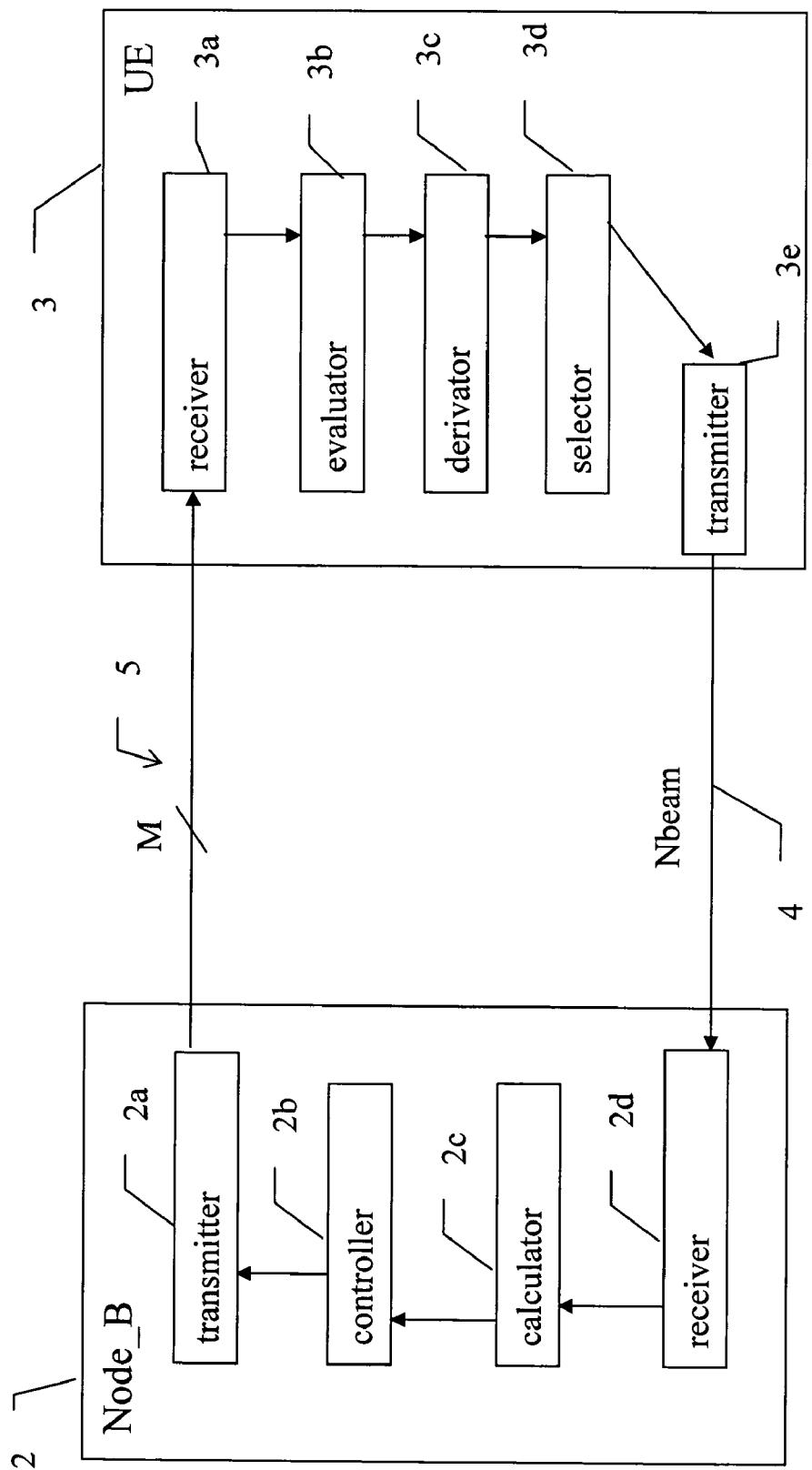
FIG. 3 shows a block circuit arrangement of a first transceiver Node_B and a second transceiver UE according to a basic embodiment.

FIG. 3 shows details of the internal configuration of a first (Node_B) 2 and second (UE) 3 transceiver, while neglecting some details already shown and described with reference to FIG. 1.

Having regard to the basic embodiment, FIG. 3 shows in the lefthand portion a first transceiver Node_B 2 which is adapted to control multiple (M) transmit beams 5. The Node_B 2 comprises a transmitter 2a which is adapted to transmit a plurality M of at least two beams via a plurality of transmission channels 5 (not shown in FIG. 3 but shown in FIG. 1) to another transceiver, i.e. second transceiver UE 3. Furthermore, the Node_B 2 comprises a receiver 2d adapted to receive beamforming information (Nbeam) fed back from the second transceiver UE 3. The receiver 2d of the Node_B 2 is connected to a calculator 2c adapted to calculate, based on the beamforming information being fed back, additional beamforming information which was not contained in the feedback path 4. The thus obtained results are forwarded to a controller 2b at the Node_B 2 which controls the transmitter 2a.

Likewise, having regard to the basic embodiment, FIG. 3 shows in the righthand portion a second transceiver UE 3 which comprises a receiver 3a adapted to receive a plurality M of at least two beams from another transceiver 2, i.e. first transceiver Node_B 2 via a plurality (M) of transmission channels 5 (not shown in FIG. 3 but shown in FIG. 1). The UE 3 further comprises an evaluator 3b adapted to evaluate characteristics of the plurality of transmitted beams received. The evaluator 3b is connected to a derivator 3c adapted to derive beamforming information for being fed back from the second transceiver UE 3 to the another, i.e. first transceiver Node_B 2, based on the evaluated characteristics, wherein the beamforming information is usable for controlling the transmitter 2a at the another (first) transceiver Node_B 2.

Further, the UE 3 comprises a selector 3d adapted to select at least one set of beamforming information for being fed back from the UE 3 via a feedback path 4 to the another transceiver 2. Note that a respective device "adapted" to perform a specific task means that the respective device is configured to perform such task.

Since the devices are configured to operate in conformity with the method described, it is clear that the selector 3d is operated based on at least one performance criteria of the transmitting, wherein the performance criteria comprise at least one of a receiving power, a bit error rate, and an interference ratio of the transmitting, i.e. the plurality of beams received at the second transceiver.

Additionally or alternatively, the selector 3d is operated based on a transmitting method applied at the another transceiver, wherein the transmitting method is defined by at least one of a modulation principle applied at the first transceiver, an interference feature configured for MIMO channels, and a coding principle applied at the first transceiver.

Such information is either inherently present within the system so that the UE 3 knows the transmission method applied by the Node_B 2, or it may be communicated within the system, e.g. using pilot channels such as the BCCH or any other suitable broadcast channel.

Selected beamforming information is then passed to the UE's 3 transmitter 3e and fed back via the feedback path 4 to the Node_B 2.

According to some embodiments of the present invention, the user equipment, at least partially, is aware of/knows about a processing to be performed at the Node_B 2. Therefore, based on the expected/foreseen processing to be applied to control information received at the Node_B 2, the user equipment 3 may modify the derived control information by applying a specific selecting/processing of beamforming information prior to feeding it back.

Specific Embodiments

Throughout the subsequent description, it is assumed that Nbeam has a value not greater than "2" in order to simplify the description. Thus, cases of Nbeam=1 and Nbeam=2 are described.

Specific Embodiment No. 1

Figure 4:
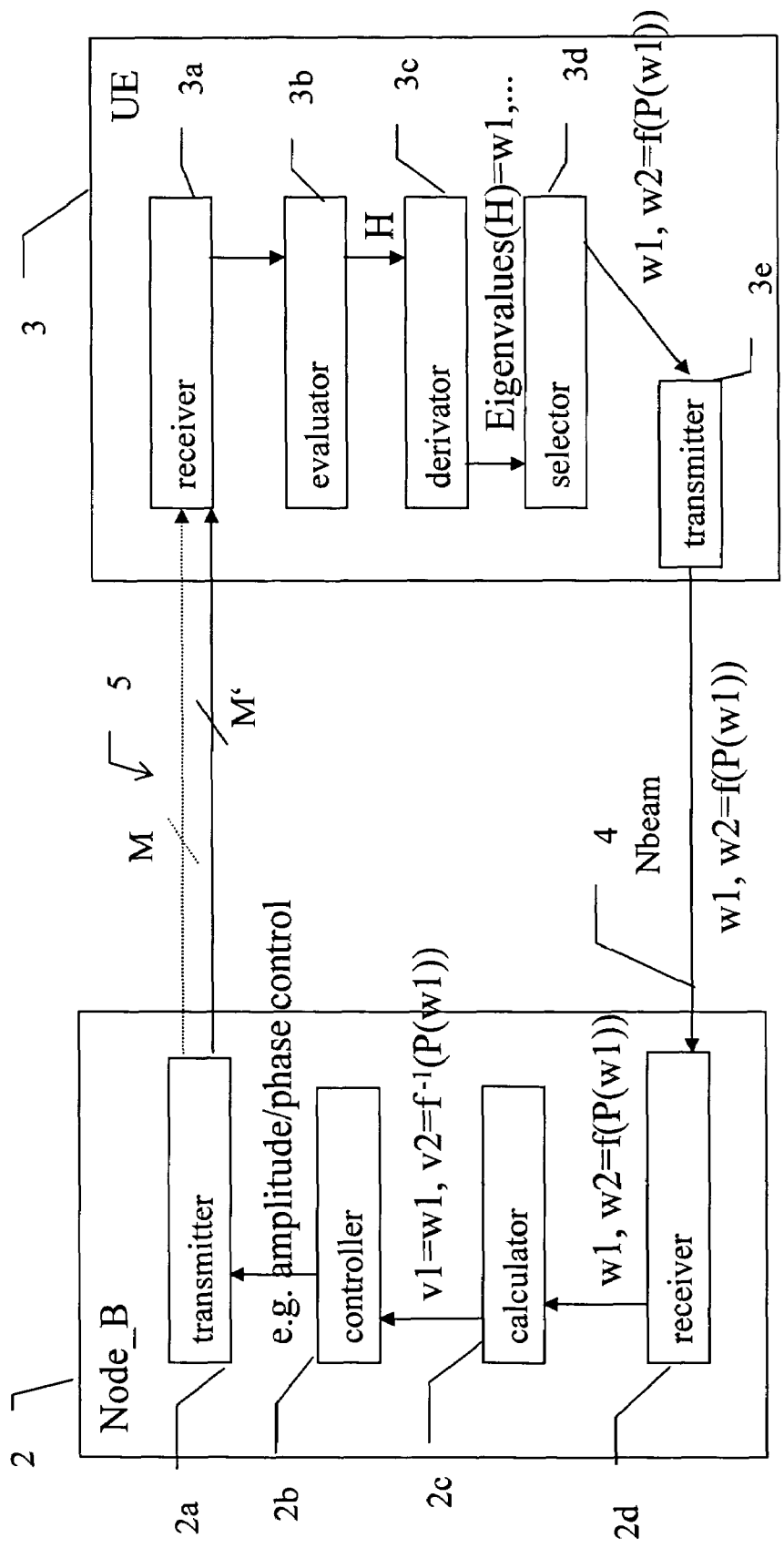
FIG. 4 shows details of a first specific embodiment in a block circuit diagram.
Figure 5:
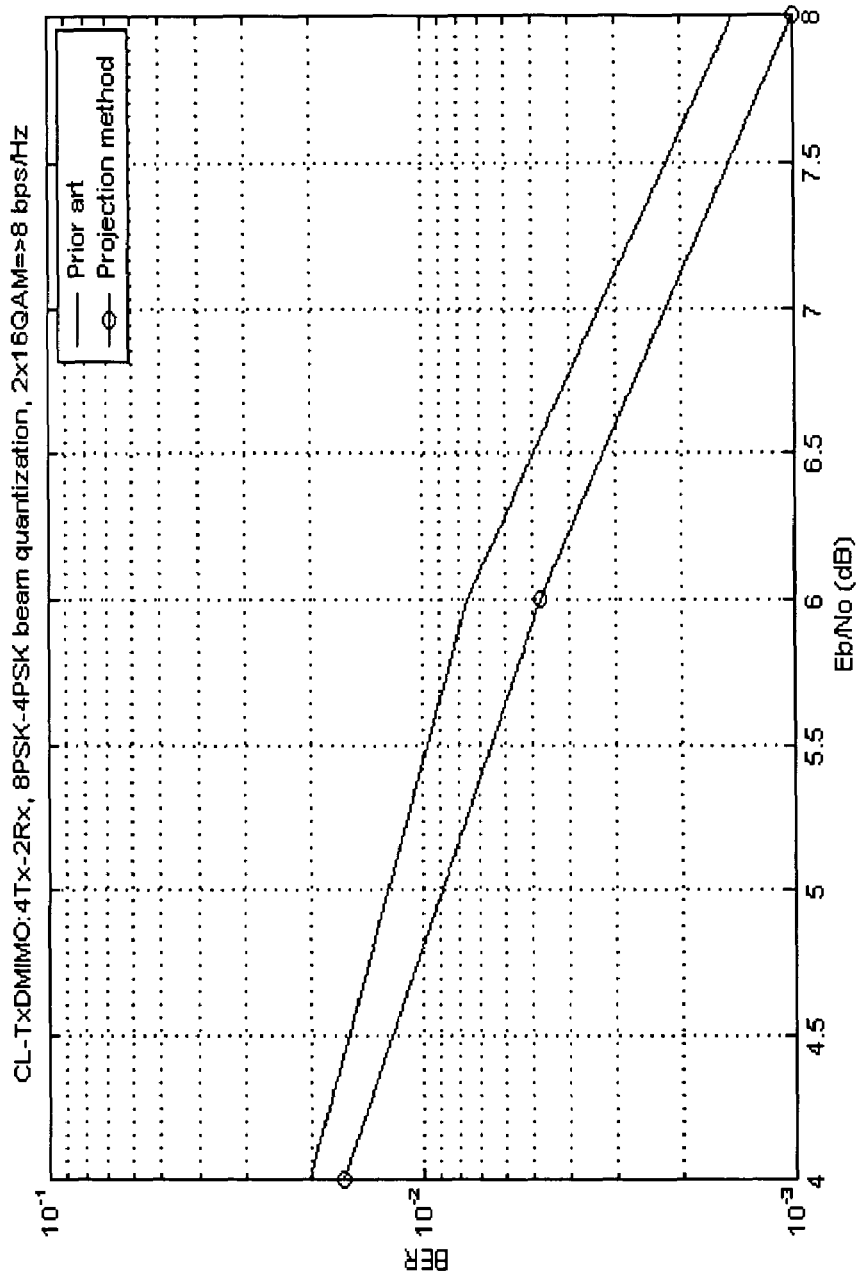
FIG. 5 shows that the proposed method gives about 0.7 dB gain over the state-of-the art method according to PCT/EP01/10229, according to research results of the present inventor.

A first specific embodiment will be described in the following with reference to FIG. 4. FIG. 4 illustrates the entire scenario while going into details of FIGS. 2 and 3, respectively.

It is to be noted that—for all embodiments—the signal processings as performed according to the method and described in detail herein are performed by the evaluator 3b, derivator 3c, and selector 3d, respectively (insofar as the UE 3 is concerned) and by the calculator 2c, controller 2b, respectively, as far as the Node_B 2 is concerned. In particular, the implementation of the specific functionality is advantageously effected in hardware as a digital signal processor DSP, or an application specific integrated circuit ASIC, or the like. Such hardware realization is technology independent and can be accomplished using bipolar or MOS, CMOS, BiCMOS technology or others and/or hybrids thereof. In case of a software implementation of the functionalities, this is programming language independent and can be implemented using any known or future developed programming language such as PASCAL, C++, or the like, as long as the functional relationship between input signals and processing performed thereon is preserved.

According to this first specific embodiment, the step of selecting, at the second transceiver UE 3 further comprises a step of projecting the selected beamforming information to nullspace, and feeding back the selected beamforming information and the nullspace projection to the first transceiver 2.

Correspondingly, according to this first specific embodiment, the step of calculating, at the first transceiver Node_B 2, further comprises a step of projecting the nullspace projection to signalspace, and controlling S26, at the first transceiver 2, the transmitting of the plurality (M) of beams based on the fed back selected beamforming information and the signalspace projection.

This will be set out in greater detail herein below.

It is assumed that Nbeam=2, which means that information related to Nbeam=2 beams and the formation of these beams using a linear combination of M antenna elements is possible to be conveyed in the feedback path 4.

For explanatory purposes, referring back to the prior art WO-A1-03/023995 mentioned earlier above, under these circumstances the feedback path capacity is partitioned between the information for the two beams. E.g. 10 bits of total feedback capacity are partitioned such that 7 bits are used for the most dominant beam (w1) and 3 bits are used for the less dominant beam (w2). Beams are thus quantized differently depending on their dominance.

In contrast thereto, the present invention takes a different approach, which uses subspace properties of the derived beamforming information.

Generally spoken and not limited to this first specific embodiment, the thus derived control information (beamforming information), i.e. the approximate eigenvectors/ eigenvalues and/or the so-called eigenbeams as derived/calculated in the user equipment 3 are orthogonal (unitary) at this stage. "Orthogonal" means in this connection that they can be regarded as being dependent on each other or as containing redundant information, i.e. one known to be orthogonal to the other. Expressed in other words, having M orthogonal beams/ eigenbeams, information on M–x, or e.g. M–1 of these is sufficient to infer/deduct information on the removed components. The number of components, or more precisely beam coordinates, that may be removed depends on the beams that are already known to the first and second transceiver. For example, initially, no beams are known, and a full M dimensional vector has to be signalled (or M–1 dimensional if first element is fixed to, e.g. value 1). Next, assuming that this signalled vector is known to the UE 3, it may project the channel or correlation matrix to the null space of the first feedback vector, and quantize the reduced dimensional vector corresponding to the second dominant beam.

For exploiting for example this interrelation, the present invention performs a selection and some processing involved in the selection as described with regard to the first specific embodiment, i.e. to use subspace structure to obtain the remaining vector of reduced dimensionality.

Referring to the matrix W above, this means that when controlling or deriving the beams sequentially, each consecutive column of the matrix W contains fewer controllable elements, for example with one element m (1<=m<=M) being removed. In one example a modified vector wm denoted as modified vector Wm(mod) is (M–1)×1 dimensional only. The coordinate is removed before signalling, but a beam with full coordinates, i.e. with coefficient for all M antenna elements, may be calculated at the first transceiver 2, by using information related first and second beam, as will be explicitly described in the following.

Referring back to the evaluating/deriving steps, the user equipment evaluated the channel matrix H based on the received transmission and derived beamforming information based on e.g. EVD. The eigenvalue decomposition revealed eigenvectors $w_1, \ldots w_{nbeam}$.

Based on this first matrix H denoted as H(1), the selecting step selects the most dominant beam indicated by the first eigenvector w1 as an at least one set of beamforming information to be fed back. Furthermore, the selecting step involves selecting the nullspace projection of the vector w1 as beamforming information to be fed back.

For purposes of a definition only, it is to be noted in terms of nullspace that:

if T is a linear transformation of an n-dimensional space of real numbers Rn, then the null space Null(T), also called the kernel ker(T), is the set of all vectors X for which holds the relation T(X)=0, i.e., $$\text{Null}(T) = \{X : T(X) = 0\}$$

The term "null space" is most commonly written as two separate words (e.g., Golub and Van Loan 1989, pp. 49 and 602; Zwillinger 1995, p. 128), although other authors write it as a single word "nullspace" (e.g., Anton 1994, p. 259; Robbin 1995, pp. 123 and 180). The Mathematica command NullSpace[v1, v2, . . . ] returns a list of vectors forming a vector space basis for the nullspace of a set of vectors over the rationals (or more generally, over whatever base field contains the input vectors).

Although the above definition was given for an n-dimensional space Rn of real numbers, similarly this holds for a space of complex numbers Cn.

Based on the eigenvalue w1 derived from evaluated matrix H, a nullspace projection matrix P is calculated based on the relation $$P = (I - w_1 w_1^H)$$

Where I denotes the unit matrix and superscript H denotes the conjugate transpose of a vector/matrix.

Under the assumption that w1 is m-dimensional ($w_1 = w_{11}, \ldots, w_{1M}$), the projection matrix is m*m dimensional. However, exploiting the property of the projection matrix that a formation of eigenvalues of (P) will lead to picking out all eigenvectors with nonzero eigenvalues, the projection matrix can be represented in a minimum representation using a m*(m–1) matrix representation, comprising an orthogonal basis of the projection matrix using the said nonzero eigenvectors.

Subsequently, the conjugate transpose of the basis representation of P, i.e. U assumes a representation of (m–1)*m (collection of the basis vectors of rank reduced matrix), and applied to the evaluated channel matrix H (and/or correlation matrix R (see above)) it yields $$U^H_{(m-1)*m} * H_{m*m} U = H_{(m-1)*(m-1)}$$

Thus, a second matrix H with one dimension being reduced is obtained. In particular, the corresponding R matrix derived using the second H matrix (see formula (1) ON PAGE 19) now has dimensions (m–1)*(m–1).

Applying eigenvalue decomposition to the correlation matrix R of second matrix H, a vector $w_2$ containing information the second beam (conditioned on the first beam) with M–1 elements only is obtained as a (further) set of beamforming information.

Then, the m-dimensional vector w1 and the m−1 dimensional vector w2 are selected for being feedback. In this regard, they are possibly quantized and fed back to the Node_B 2.

At this stage, it is worth being noted that for feeding back vectors w1 and w2 the principles known from the inventors cited earlier application may advantageously be applied in that w1 is quantized to a constellation using a higher bit number while w2 is quantized to a constellation using a lower bit number, as outlined herein above. Namely, the user equipment 3 may encode (but is not required to encode) the selected beamforming information for subsequent transmission via the feedback path to the Node_B 2. For example, encoding may reside in quantizing the eigenvectors or diversity vectors. Quantized feedback (eigen)beams are in general no longer orthogonal. The user equipment UE 3 then transmits the Nbeam diversity vectors (with e.g. reduced to M−1 antenna elements per beam) (in this case Nbeam=2, w1 and w2 are transmitted) to the network such as UTRAN (Universal Terrestrial Radio Access Network), represented by a Node_B 2 in FIGS. 1 and 3. Preferably, the dominant beams are represented with greater accuracy or signalled with greater error resilience (higher power, better coding), as it is described in the above referenced patent application by the same inventor.

However, it is to be noted that w2 contains information related to M−1 subspace only and thus information related to one signal dimension or antenna element is not transmitted/included in w2. This is advantageous in that a bit reduction on the feedback path 4 can be achieved due to vector w2 not containing information pertaining to one of M dimensions. Nevertheless, all coordinates of w1 and w2 thus obtained are fed back and the beam information related to the original two dominant M-dimensional beams may be reconstructed at the transmitting unit from w1 and the reduced dimensional w2.

Thus, w2 can be fed back including less than M components due to exploiting subspace structure of the eigenbeams/eigenvectors prior to quantization.

In order to properly conduct the feedback control and the reconstruction of the M-dimensional beams at the Node_B's 2 side, a corresponding reception processing is be implemented. Aspects of decoding encoded/quantized beamforming information are not considered here, but only those aspects which serve to calculate, in step S25, at the first transceiver, based on the selected beamforming information being fed back, additional beamforming information which was not contained in the feedback path.

To this end, a reconstruction processing/calculation is implemented at the Node_B 2. The Node_B 2 (first transceiver) reconstructs by calculating a beam space (i.e. higher dimensional) representation using the nullspace projected vector. Beam space representation is accomplished by multiplying the nullspace projection result (i.e. m−1 dimensional vector) using the nullspace basis vectors U. Thus, let U be the matrix that contains the null space basis vectors, then U was applied for null space projection (resulting in a dimension reduction/component removal). Beam space as used herein is sometimes also referred to as signal space.

Expressed as a formula with reference to the above example:

$$U_{m*(m-1)} * w_2 = v_2$$

Note that $w_2$ is an (m−1)*1 dimensional vector and v2 is again in an m*1 dimensional vector.

Note further that due to vector $w_1$ not being projected to null space, the beamforming information thereof fed back is used "as it is" (except for possibly decoding it) by the first transceiver for controlling the antenna array. Thus, $v_1=w_1$.

Stated in other words, generally, the first transceiver device acting as a transmitter for the diversity beams 1 ... M receives the number of $N_{beam}$ signalled beams/diversity vectors, each or at least one possibly of different dimensionality. Of course, as mentioned above, such a receiving may involve a decoding of the received beams.

The first transceiver device Node_B 2 then determines based on the received diversity vectors being fed back, a reconstructing processing, e.g. using a projection-based method to obtain a reconstructed diversity vector $V=[V_1, \ldots, V_k, \ldots, V_{Nbeam}]$, $1<=k<=N_{beam}$.

In this reconstructed diversity vector, each k-th component of $N_{beam}$ components has again M components.

A respective reconstructed beam #k is formed by projecting the corresponding signalled feedback vector to for example, the beam-space, of the previous (e.g. more dominant) k−1$^{st}$ modified beams. Null space basis or signalspace basis projection is one example only for such a projection method, others are conceivable as long as they achieve the reconstruction.

As an example, again with two parallel beams ($N_{beam}=2$), $$V_1=w_1$$

$$V_2=U_1*w_2$$

Here $U_1$ is a basis matrix, corresponding to the nullspace_ basis based on $w_1$, which may be subject to feedback errors. Recall that the second transceiver uses related U to derive $w_2$, by projecting derived information (second eigenbeam) to null space of $w_1$. Here, the first transceiver uses preferably the same algorithm as the second transceiver when deriving U. This means that the matrix U and $U_1$ is calculated anew at the first transceiver Node_B upon receipt of $w_1(=v_1)$. When U is unitary, as mentioned above, the projection matrix may be derived from U, as $P=U*U^H$. (Note that the operator "'" is in some formulas also indicated as "$^H$" and denoting a transpose conjugate complex representation of a matrix/vector concerned.)

More generally, (for k>1)

$$V\_k=null\_space\_basis([w\_1, \ldots, w_{k-1}])*w\_k,$$

where the notation says that a null space basis corresponding to k−1 feedback signals is formed in a manner analogous to that given above for the case k=2.

Null space basis matrix U may be formed in a number of ways. For example columns of U may be determined as (a linear combination of) unit eigenvectors of the projection matrix $$A=(I-w_1 w_1^H)$$

with regard to the above example of two parallel beams, and with regard to the above generalization as $$A_k=(I-[w_1, \ldots w_{k-1}][w_1, \ldots, w_{k-1}]^H)$$

where I is the unit matrix, $w_k$ the above (normalized to unit power) matrix component received with e.g. M−1 components, and $^H$ denotes the transpose conjugate complex of the vector.

Once the Node_B 2 has processed the received selected at least one set of beamforming (control) information to reconstruct the (initially) derived, i.e. entire control information, i.e. recovered the "removed" information by the projection processing such as null space projection, the Node_B uses the control information to adapt the M transmit beams emerging from the M antennas/antenna elements.

Returning to the example of $N_{beam}=2$, V_1 and V_2 each of M components is reconstructed, and optional power/phase adjustment can be adjusted for V_2, V_1. Stated in other words, the control information in V_2 may be used for power control of the M antennas, while the control information in V_1 may be used for phase control of the M antennas. The transmitter maps transmitted information onto two beams.

Returning to the example of $N_{beam}=2$, V_1 and V_2 each of M components is reconstructed, and optional power/phase adjustment can be adjusted for V_2, V_1. Stated in other words, the control information in V_2 may be used for power control of the M antennas, while the control information in V_1 may be used for phase control of the M antennas. The transmitter maps transmitted information onto two beams.

As a numerical example: Let H be evaluated as $$H = \begin{array}{cccc} -0.8246 & +0.9690i & -1.5719 & -1.4212i & 0.6808 & +0.5981i \\ -0.1970 & -2.1875i & 0.7439 & -0.7106i & -1.6136 & +0.0296i \\ 0.1270 & -2.5494i & -0.2605 & +1.8525i & -0.5073 & -0.6816i \\ 0.6234 & +0.9370i & -1.3446 & -1.0387i & -0.1721 & +0.1010i \end{array}$$

The first eigenbeam (derived/selected beamforming information) is $$orig1 = w_1 = \begin{array}{c} -0.4899 + 0.0531i \\ 0.3293 - 0.3672i \\ 0.6217 \\ -0.2789 + 0.2228i \end{array}$$

and second derived information is $$orig2 = w_2 = \begin{array}{c} 0.2260 - 0.3493i \\ 0.6487 \\ 0.0410 - 0.5067i \\ 0.3841 - 0.0119i \end{array}$$

The second transceiver UE 3 calculates the feedback signal corresponding to w1, with each element (except first) quantized to PAM-PSK constellation similar to Mode 2 in WCDMA tx diversity, to obtain $$feedback1 = \begin{array}{c} 0.5000 \\ -0.6000 + 0.3000i \\ -0.5000 \\ 0.2000 - 0.1000i \end{array}$$

The null space basis matrix (referred to as U above) is $$Nu1(feedback1) = \begin{array}{ccccc} 0.6000 & +0.3000i & 0.5000 & & -0.2000 & -0.1000i \\ 0.7000 & +0.0000i & -0.2000 & +0.1000i & 0.1000 & \\ -0.2000 & -0.1000i & 0.8333 & & 0.0667 & +0.0333i \\ 0.1000 & & 0.0667 & -0.0333i & 0.9667 & \end{array}$$

For null space projecting, the above matrix is transposed to $U^H$. And the second beamforming information being fed back results from processing the selected at least one (first) beamforming information and—as described above—determined from the eigenvalue decomposition applied to R_new=Nu1^{H}*R^{Nu1}, where R is the appropriate correlation matrix (short or long term). The dominant eigenvector of R_new is calculated, and quantized to appropriate constellation in order to feedback it to BS. If quantized to 3-PSK constellation, the second feedback signal ($w_2$) is $$feedback2 = \begin{array}{c} -0.2887 + 0.5000i \\ 0.5774 \\ -0.2887 + 0.5000i \end{array}$$

with one dimension reduced.

The first transceiver receives feedback2 (assume error free) and uses a commonly agreed algorithm to calculate Nu1. The reduced dimensional feedback is then augmented (reconstructed) to M array elements by signal space projection, i.e. calculating Nu1*w2, to yield $$beam2 = \begin{array}{c} 0.0732 + 0.1423i \\ -0.3464 + 0.4577i \\ 0.5529 - 0.0474i \\ -0.2694 + 0.5141i \end{array}$$

Thus, beam_1=feedback1, and beam2 is given above.

In a modification of this embodiment, the null space projection (or related nullspace basis vectors) is used only at the first transceiver (Node_B). In this case, orig2 is also (like orig1) quantized to appropriate constellation (without dimension reduction) and signalled to first transceiver. If quantized to BPSK constellation the feedback signal is $$feedback2b = \begin{array}{c} 0.5000 \\ 0.5000 \\ 0.5000 \\ 0.5000 \end{array}$$

However, now the first transceiver (Node_B) uses the projection matrix based on feedback1, to modify feedback2, to yield $$= beam\_2 = A * feedback2b = \begin{array}{c} 0.6156 + 0.0513i \\ 0.3591 \\ 0.4104 - 0.0513i \\ 0.5643 \end{array}$$

This beam may be still modified in the first transceiver before its use in transmission, e.g. to comply with the set of feasible beams the transmitter supports.

The difference between the first specific embodiment and its modification resides in the fact that the second transceiver (UE) 3 derived feedback information without using the subspace (null space) structure. This increases robustness to feedback errors, as the first transceiver may enhance the beam using only received information. On the other hand, the first specific embodiment can be used to mitigate feedback capacity, since reduced dimensional feedback signal is used.

Stated in other words, the modification as described transmits $w_1$ and $w_2$ as such via the feedback path. The Node_B 2 performs the null space projection and enforces orthogonality. The orthogonalization keeps the dominant beam unchanged, and the orthogonalization information is conditioned on the $1^{st}$ of $N_{beam}$ beams, in which the $2^{nd}$ beam is included.

The feedback beams may be represented in the signalling part of the concept in an arbitrary way, e.g. as bits described above, or as symbol sequences, or as coded bits, etc.

FIG. 4 summarizes the above explanations graphically with regard to the first specific embodiment. Initially, M beams are transmitted from Node_B 2 to UE 3. The UE 3 evaluates, derives and selects/processes beamforming information and feds back beamforming information w1 and w2 (nullspace projected). Upon reception thereof at the Node_B 2, the Node_B 2 calculates the signal or beamspace projection v1, v2 of the feedback beamforming signal w1, w2 (nullspace projected), and uses the results for controlling the subsequent transmit beams M'. A main advantage of this scenario resides in savings in the feedback path 4 transmission capacity since the number of bits used for transmitting $w_2$ is reduced due to the fact that $w_2$ contains at least one dimension less than w1. The "missing" information is calculated but upon receipt at the Node_B 2.

The subspace structure may be used in different ways. For example, one may derive new beams as being uncorrelated (or with some maximum correlation) to the more dominant beams. This is useful when the receiver (Second transceiver UE) signals the dominant beams, as has been described herein above.

The user equipment 3 may encode (but is not required to encode) the beamforming (control) information for subsequent transmission via the feedback path 4 to the Node_B 2. For example, encoding may reside in quantizing the eigenvectors or diversity vectors. Quantized feedback (eigen) beams are no longer orthogonal. The user equipment UE 3 then transmits the $N_{beam}$ diversity vectors (with e.g. reduced to M−1 antenna elements per beam) to the network such as UTRAN (Universal Terrestrial Radio Access Network), represented by a Node_B 2 in FIG. 1. Preferably, the dominant beams are represented with greater accuracy or signalled with greater error resilience (higher power, better coding), as it is described in the above referenced patent application by the same inventor.

Specific Embodiment No. 2

According to another aspect of such concept, to further reduce signalling, the UE may signal only the least-dominant beam, e.g. the one with smallest eigenvalue (stated in other words, not the "best" eigenvalue/eigenvector is selected (and processed) as in specific embodiment no. 1, but the "worst" eigenvector is selected for being fed back). This corresponds to deriving control information on "directions" where not to transmit from the base station.

For example with 4 transmit elements, using MIMO transmission method requiring 3 transmit beams, the control (beamforming) information for forming three beams can be derived at the first transceiver Node_B as being orthogonal to the signalled least dominant beam received via the feedback path, using null space projection. Any unitary basis orthogonal to the least dominant beam is feasible. Thus, the beamforming matrix to be used at the Node_B can be derived based on the "worst" eigenvector, as described in the preceding specific embodiment. More precisely, with M=4 and eigenvectors $w_1$ to $w_4$ resulting from evaluating/deriving steps, and $w_4$ representing the weakest/worst eigenvector, the projection matrix could be determined based on $P=(I-w_4 w_4^t)$ in a similar manner as described above. The corresponding basis can be found e.g. from eigendecomposition as given above.

Then, if each coordinate of the least dominant beam is separately quantized, only 4 complex coefficient are signalled to the base station (3 if one element is fixed so some a priori given value, say 1), and the transmitter knows that it avoids transmitting to directions that are useless. Essentially, the transmitter may transmit to the null space of the least dominant beam(s).

In other regards, this specific embodiment is similar to specific embodiment No. 1.

Specific Embodiment No. 3

A third specific embodiment will be described in the following. According to the third specific embodiment, the most dominant beam's eigenvector w1 is selected for being fed back to the first transceiver. All coordinates of this vector $w_1$ are transmitted to the Node_B. This provides the advantage that further feedback capacity savings are possible (compared to the first specific embodiment) and that only minimum changes to the feedback path, e.g. in terms of frame structure adopted for signal transmission from the UE to the Node_B are required. In this embodiment, the Node_B has a knowledge of what kind of processing the UE applied. Then, at the Node_B null space projection is applied to the received beamforming information feed back, or the corresponding nullspace basis is calculated Based on received w1, w2 is obtained as in the specific embodiment no. 1, but this information is obtained/calculated but at the Node_B and not transmitted over the feedback path. Thus, at the Node_B, the same or substantially similar information as in the specific embodiment 1 is available, but without transmitting all of this information via the feedback path. Stated in other words, this scenario approximates the specific embodiment 1 with approximately half of the feedback capacity.

In other regards, this specific embodiment is similar to specific embodiment No. 1.

Further Modifications to Embodiments

In addition to each of the above embodiments and/or modifications thereof, UE short-term functions can be exploited in that the UE calculates the effective channels (example of $N_{beam}=2$)

$$h_{1,eff}=H_p^H v_1$$

$$h_{2,eff}=H_p^H v_2$$

using the reconstructed matrix v, and the UE uses the effective channels to determine further feedback information and/or receive signal processing information pertaining to modulation and coding schemes applied. This information may be rate control, power control, phase control, adaptive coding and modulation control etc. Furthermore, the second transceiver may generate a set of tentative beams, by running the aforementioned algorithms (possibly with emulated feedback errors) before signalling the beams to first transceiver, and determine a virtual received signal (model), and thereby have proper criteria in order to select the appropriate feedback for beams, modulator, etc.

Alternative methods may also be used at the base station and/or Node_B to further enhance transmit beam specification. For example, the BS may determine the modified beams or the null space from $$\alpha R1+(1-\alpha)R2$$

where R1 is a correlation matrix determined (constructed) using feedback information (e.g. R1=B*B'), and R2 is a channel correlation matrix using blind uplink measurements.

The alpha parameter can be used to tune the relative weighting of the two schemes. In addition, R1 and/or R2 may be constructed as a weighted sum of constituent correlation matrices, e.g. as weighted outer products of feedback beams for R1, where the dominant beams have a larger weight than the less dominant beams. The weights may be determined from additional feedback (quantized eigenvalues) or by a priori setting some unequal weights for each term, if additional feedback is not desirable. In any case, the invention modifies the feedback beams, so that the less feedback dominant beams have a smaller effect when determining the final transmit beams.

Naturally, the modified M beams may also be quantized to some constellation for transmission, although this may be avoided if the system is designed so that the UE and the BS both know the algorithm how the beams are constructed. Then, the UE can calculate to beams exactly as the BS. Stated in other words, the present invention has heretofore been described with a focus on being applied to the feedback path (uplink), however, the same principles may easily be applied to the feedforward path (downlink).

As described in connection with the present invention, the invention uses feedback information (provided e.g. by UE to BS) and its structural (subspace) properties to improve closed-loop Tx-diversity and/or closed-loop MIMO transmission. Quantized feedback(eigen)beams are not orthogonal. The invention uses the fact that the eigenbeams, as calculated in e.g. the UE, are orthogonal prior to quantization. Furthermore, the invention uses the relative efficiency of at least two beams, to orthogonalize the received and quantized beams in the transmitter (i.e. does a reconstruction). Orthogonalization is done so that e.g. a more dominant beam is flattered.

Even though the present invention has been described with a focus on downlink transmission from a Node_B to a user equipment UE, it is evident that the same inventive principles can be applied in uplink direction. That is, the roles of UE and Node_B are then reverted (which would imply that a UE is capable of performing diversity transmission). Also, the inventive concept can be applied in uplink as well as in downlink simultaneously.

As will be appreciated from the foregoing description of the invention and embodiments with modifications thereof, according to the present invention, the subspace (orthogonality) constraint is applied either at Node_B or a user equipment UE, or even both. If applied only at UE, then in some embodiments the Node_B also knows what the user equipment UE has done (in order for the Node_B to be able to reconstruct the beams). But, if a user equipment UE constructs feedback information conventionally (without applying the subspace constraint), the Node_B may pose the subspace constraint.

For channel estimation, it helps if the user equipment UE knows the final beams, therefor it is useful if the UE knows the algorithm applied by the Node_B (if it is deterministic the UE knows the outcome, i.e. the used beams). But, if channel estimation for a user equipment UE for the derived beams (i.e. after the beams are used for transmission) is not a problem, the UE need not know the algorithm.

Thus, according to the present invention there are cases in which beams that are used by the Node_B or BS are maintained at least partly uncorrelated (e.g. orthogonal), and if the feedback beams were highly correlated, the BS would modify them to make them less correlated, by possible changing coefficients and/or power.

Also, in some cases, the VE knows the way the BS operates, at least partly, so that even if only one beam is transmitted to BS, the BS may derive additional beams if it so desires (e.g. as one beam belongs to null space, calculated by some predetermined algorithm known to both); conversely, the UE may signal the worst possible beam(s), and the BS makes sure that beam set is not used.

In embodiments or modifications thereof in which the respective transceivers have to be aware of the processing applied at the respective other transceiver involved in the method, the transceiver concerned either knows the processing applied at the other transceiver, e.g. due to configuration information internally present at the transceiver, or knows the processing by learning it from a corresponding received signalling from the respective other transceiver. Such an indication could be transmitted e.g. in a common or dedicated control channel.

Accordingly, as has been described hereinbefore, the present invention concerns a closed-loop signalling method for controlling multiple transmit beams, comprising the steps of transmitting (S21) a plurality (M) of at least two beams (beam_1, ..., beam_m, ..., beam_M) from a first transceiver (Node_B) via a plurality of transmission channels to a second transceiver (UE), evaluating (S22), at the second transceiver, characteristics of the plurality of transmitted beams received at the second transceiver (UE), deriving (S23), at the second transceiver (UE), beamforming information for being fed back from the second transceiver (UE) to the first transceiver (Node_B) based on the evaluated characteristics, the beamforming information being usable for controlling, at the first transceiver, the transmitting of the plurality of beams, selecting (S24), at the second transceiver, at least one set of beamforming information for being fed back from the second transceiver via a feedback path to the first transceiver, and calculating (S25), at the first transceiver, based on the selected beamforming information being fed back, additional beamforming information which was not contained in the feedback path. Likewise, correspondingly adapted transceivers are concerned.

The invention has been described predominantly herein in terms of maximizing the signal power, but the proposed concept can be used also in the context of optimising some other criteria. For, example, we find the (first) dominant (feedback) vector that maximizes capacity (throughput, etc), then use the null-space information of that vector to find another feedback vector that is constrained to be orthogonal to the first, while maximizing the capacity when combined with the first feedback vector. On the other hand, we may find more than one feedback vector at a time, for example two, and constrain the feedback vectors to have a particular subspace structure when combined with the first two. Thus, the invention has be used in a number of different contexts as long as the signal subspace structure is used in enhancing feedback signalling resolution, quality or mitigating required feedback capacity for given resolution, regardless of the target performance measure to be optimised with said feedback vectors.

In particular, the concept can be used also in a multicarrier system and the beams may be defined to selected subcarriers according to the same principle. The quantization of each beam may done according any quantization method, e.g. using codebooks. It is to be noted that different beams may use different quantization codebooks, representable by a different number of bits. Also, in multicarrier (e.g. OFDM) system, different subcarriers have different powers, and according to an embodiment of the invention, when beams for different subcarriers are quantized, one of the beams applied to one subcarrier may be allocated a different number of bits (or indexes in codebook) than another. Preferably, a weaker subcarrier is allocated fewer bits.

The invention claimed is:

1. An apparatus, comprising:
a transmitter configured to transmit a plurality of beams via a plurality of transmission channels to another transceiver;
a receiver configured to receive beamforming information and nullspace projection information fed back from the another transceiver; and
a calculator configured to calculate, based on the beamforming information being fed back, additional beamforming information which was not contained in a feedback path, wherein
the calculator further comprises,
a projector configured to project a received nullspace projection back to a beamspace projection, and
a controller configured to control transmitting of the plurality of beams based on the beamforming information and the beamspace projection.

2. A system, comprising:
transmitting means for transmitting a plurality of beams from a first transceiver via a plurality of transmission channels to a second transceiver;
evaluating means for evaluating, at the second transceiver, characteristics of the plurality of beams received at the second transceiver;
deriving means for deriving at the second transceiver, beamforming information to be fed back from the second transceiver to the first transceiver based on the characteristics, wherein the beamforming information is usable for controlling, at the first transceiver, the transmitting of the plurality of beams;
selecting means for selecting, at the second transceiver, at least one set of beamforming information to be fed back from the second transceiver via a feedback path to the first transceiver, wherein the selecting means further comprises
projecting means for projecting the beamforming information to a nullspace projection, and
transmitting means for feeding back the beamforming information and the nullspace projection to the another transceiver; and
calculating means for calculating, at the first transceiver, additional beamforming information which was not contained in the feedback path based on the at least one set of beamforming information, wherein the calculating means further comprises
projecting means for projecting a received nullspace projection back to a beamspace projection, and
controlling means for controlling transmitting of the plurality of beams based on the beamforming information and the beamspace projection.

3. A method, comprising:
transmitting a plurality of beams via a plurality of transmission channels to a second transceiver;
receiving beamforming information fed back from the second transceiver; and
calculating, based on the beamforming information being fed back, additional beamforming information which was not contained in a feedback path, wherein
the calculating further comprises projecting a received nullspace projection back to a beamspace projection, and controlling transmitting of the plurality of beams based on the beamforming information and the beamspace projection.

4. A coding principle applied at a first transceiver, the coding principle being configured to control a processor to perform:
transmitting a plurality of beams via a plurality of transmission channels to a second transceiver;
receiving beamforming information fed back from the second transceiver; and
calculating, based on the beamforming information being fed back, additional beamforming information which was not contained in a feedback path, wherein the calculating further comprises projecting a received nullspace projection back to a beamspace projection, and
controlling transmitting of the plurality of beams based on the beamforming information and the beamspace projection.

* * * * *